Feb. 20, 1951 R. C. FOX ET AL 2,542,807
ELECTRONIC TRANSFER UNIT
Filed Oct. 24, 1946
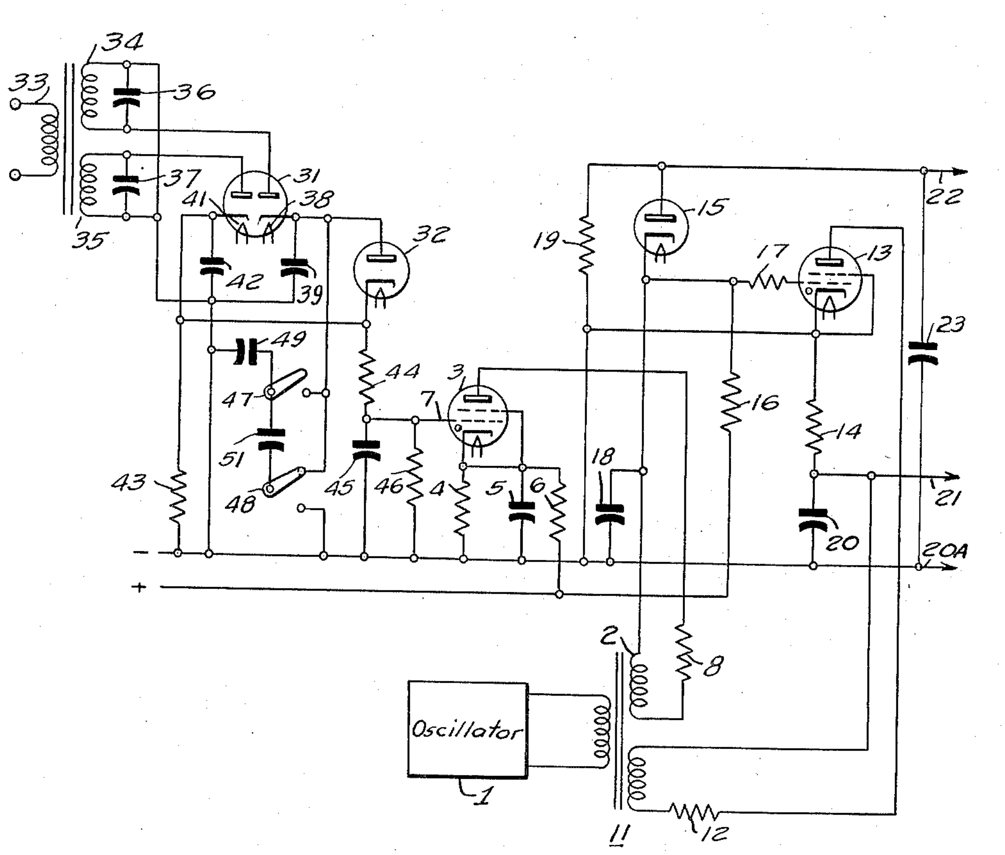
WITNESSES:
INVENTORS
Roy C. Fox and
Frederic S. Beale.
BY
ATTORNEY Patented Feb. 20, 1951 2,542,807

UNITED STATES PATENT OFFICE 2,542,807

ELECTRONIC TRANSFER UNIT

Roy C. Fox and Frederic S. Beale, Baltimore, Md., assignors to Westinghouse Electric Corporation, East Pittsburgh, Pa., a corporation of Pennsylvania Application October 24, 1946, Serial No. 705,362

8 Claims. (Cl. 315—171)

Our invention relates to electronic switching devices and, in particular, relates to switching devices of the type sometimes known as transfer units which are used on two-way teelphone systems to cause alteration of connections of a carrier transmitter and recevier at each station to occur automatically in response to incidence of a user's speech in the microphone. In other words, such transfer units automatically change the circuit connections as two users at different stations alternately speak into their respective microphones in carrying on a two-way conversation. One widely used system of this type is the carrier telephone systems employed by operators of electric power systems in which the power transmission line itself furnishes the channel for the carrier currents. A system of this type, upon which the present invention can be employed with improving effect, is shown in United States Patent No. 2,310,060, Booth and Bock, issued February 2, 1943, for Two-Wire Radio Transmission, and assigned to the assignee of the present application.

The aforesaid Patent No. 2,310,060 describes a two-way carrier-current telephone system in which each station comprises a transmitter including a generator of carrier current modulated by a local microphone and a receiver to demodulate a carrier current message coming in over the line. Since the transmitter and receiver at each station are connected to the same transmission line, it is necessary that while speech into the local microphone at any station is modulating the carrier-current generator there, the local receiver shall be cut off from the line to prevent its repeating and reverberating the message which is being sent out at the moment by that station. It is further necessary that when carrier current is bringing in a message from a distant station, the receiver be fully energized to demodulate it, but that the local transmitter shall be cut off from the line so that it cannot impose on the latter a confusing signal. In short, switching functions must be performed on both the transmitter and the receiver at each station alternaely to fit the system for two-way conversation.

In the aforesaid patent, this switching is achieved by providing, when no signal is being either received or transmitted, the local oscillation generator (numbered 102 in the patent), constituting a part of the transmitter, and an audio amplifier (55), constituting part of the receiver, with negative bias voltages which make them non-conductive; while at the same time a modulating amplifier (101 and 153), acting on said oscillator, and a radio frequency amplifier (13) constituting part of the receiver, are so biased as to be conductive and operative. Then, when a user speaks into the microphone at any station, the aforesaid negative bias is removed from the local oscillator 102, thus sending out carrier current over the line to a called station. The resulting reception of this carrier current at the distant station causes the removal of the negative bias voltage blocking the audio omplifier (55) at that station, thus permitting the user there to hear the message impressed on the line by the sending station. At the same time, a new negative bias voltage is developed by the microphone output at the sending station and impressed on the local receiver radio frequency amplifier (13) to block it and render it temporarily unresponsive to the current being impressed on the line by the local oscillator there. Likewise, a second new negative bias voltage is developed at the distant station by the current entering the receiver there from the line, and this bias voltage is impressed on the modulating amplifier (101) at that station to render it nonconductive and inoperative to impress any words which might be spoken into the microphone there on the transmission line as long as a message is coming in. In other words, once a given station attains control of the transmission channel by impressing a message thereon, it cannot be interrupted by a speaker at the receiving station until the first station ceases to speak.

Cessation of speech at the first station causes disappearance of the microphone current to reimpose the negative blocking bias on the local oscillator there, thus cutting off carrier current from the transmission line. Consequently, the entire transmitting system returns to its initially-described condition which will hereafter be referred to by the term "normal." Resumption of speech at either station then carries out again the above-described sequence of switching operations.

It will be seen from the above that to conduct these switching operations, each station requires two sets of negative bias voltages, each set comprising a first voltage which is substantial while a control current is zero and which is reduced to zero when the control current comes into existence, and also a second voltage which is zero while the control current is zero and which become substantial when the control current comes into existence. For one of these sets of bias voltage, the control current is the output of the local microphone; for the other set, the control current is carrier current coming in over the transmission line from the distant station.

One object of our invention is, accordingly, to provide a circuit for supplying such sets of two negative bias voltages as are described in the preceding paragraph.

Another object of our invention is to provide the above-described sets of bias voltage in such a way that the initiation of flow of the control current causes the normally existing negative biasing voltage to fall to zero only slowly, but the normally zero bias voltage to rise very rapidly.

Another object of our invention is to provide the above-described sets of bias voltage in such a way that the one which is normally substantial and falls to zero when the control circuit is energized does so after the rise of the normally zero bias voltage.

Another object of our invention is to provide sets of the above-described bias voltages in such a way that the one which is normally substantial and falls to zero upon the energization of the control circuit does so as a result of the rise of the normally zero bias voltage.

Still another object of our invention is to provide the above-described sets of bias voltage which are of such a type that the rise from zero after the disappearance of the control current of that bias voltage which is normally substantial shall occur before the fall to zero of the other bias voltage which is normally zero.

A still further object of our invention is to provide bias voltages which come into existence so quickly after energization of the control circuit that the complete switching of the system occurs in a time of the order of 50 milliseconds; that is to say, the telephone system may be switched on and off between words of ordinary speech. Such switching is faster than the brain responses of the user.

A still further object of our invention is to provide a system in which, while the transmitter is switched onto the line with high speed after the initiation of speech, the switching off of the transmitter after cessation of speech is subjected to a very substantial time delay, and the ratio of the time delay to the initiating period can be varied at will by operating certain manual switches provided in the system.

Other objects of our invention will become apparent upon reading the following description, taken in connection with the drawing in which the single figure is a schematic diagram of a preferred circuit for producing the bias voltages described above in connection with our invention.

Referring in detail to the drawing, the switching operations carried out by the transfer unit at each station are powered by a local oscillator 1 having a frequency above the audio band-pass limits of the associated equipment. Alternating voltage from this oscillator is impressed by a secondary winding 2 upon the anode of an electrical discharge tube 3 which is preferably, although not necessarily, of the gas-filled, or Thyratron, type. The cathode of the tube 3 is connected through a resistor 4 shunted by a capacitor 5 to the negative line which is connected to the negative terminal of a direct-current voltage source (not shown). The positive terminal of this voltage source is likewise connected to the cathode of the tube 3 through a resistor 6 providing the bias necessary to render the tube 3 non-conducting in the normal condition. The control voltage to which the switching system or transfer unit is intended to respond may be impressed between the control electrode 7 of the tube 3 and the negative line. In the receiver portion at a station, this control voltage may be generated by carrier current coming in over the transmission line; which in practical cases will usually be supplied to the control electrode 7 through one or more amplifier stages. A current limiting resistor 8 is preferably connected in series with the anode of the tube 3.

A second secondary winding 11, energized by the oscillator 1, is connected through a current limiting resistor 12 to the anode of another electrical discharge tube 13 which is preferably similar to the tube 3. The cathode of the tube 13 is connected through a resistor 14 to the opposite end of the secondary winding 11. The terminal of the secondary winding 2 is connected to the cathode of a rectifier which may, for example, be a diode 15, and is also connected through a suitable limiting resistor 16 to the positive terminal of the above-mentioned direct-current voltage source. The cathode of the diode 15 is connected through a suitable resistor 17 to the control electrode of the tube 13. It is also connected through a capacitor 18 to the negative line. The anode of the diode 15 is connected to said negative line through a resistor 19, and the common terminal of the secondary winding 11 and of resistor 14 is connected to said negative line through a capacitor 20. The cathode of the tube 13 is directly connected to said negative line 20A, which is connected to act as the ground or negative bias of the controlled transmitter and receiver system.

It will be noted that the secondary winding 11 is connected through resistors 14 and 12 between the anode and cathode of the tube 13 and that the direct-current voltage source above-mentioned impresses its voltage through the resistors 16 and 17 to make the control electrode of tube 13 positive relative to its cathode. Under such circumstances, when no control voltage is impressed on the control electrode 7 of tube 3, tube 13 is conductive, rectifying the output of secondary winding 11 to produce a direct-current voltage drop across the resistor 14, making the lower terminal of the latter negative relative to the cathode of tube 13. The resistor 14 may, accordingly, be used as the source of negative bias voltage which is normally in existence when no control current is being impressed on the input circuit of tube 3. In other words, the lower terminal of the resistor 14 may be the source of negative bias potential which is required when the telephone system is in its normal, or unenergized, condition.

In contrast to tube 13, it will be noted that, while the control electrode 7 of tube 3 is at the potential of the negative line when the control voltage is zero, the cathode of tube 3 is made positive relative to said negative line by the current flowing serially through the resistors 4 and 6 from the positive terminal of the direct-current source. The ratio of the resistors 4 and 6 is made such that the voltage impressed on the anode of tube 3 by secondary winding 2 through resistors 8 and 16 and the positive terminal of the aforesaid direct-current source is insufficient to cause current flow through tube 3 when the control electrode 7 thereof is at the potential of the negative line. Since the anode of the diode 15 is at the potenial of the negative line, while the cathode thereof is connected to the positive line through resistor 16, no current flows through the diode 15 when tube 3 is non-conductive.

If now an incoming signal impresses a voltage on the control electrode 7 to make it positive, the circuit constants are so proportioned that tube 3 immediately becomes conductive. Resistors 6 and 16 are large compared to the resistance of elements 4, 15 and 19. The secondary winding 2 then sends current through resistors 8, 4, 19 and tube 15, thereby producing such a voltage drop through the resistor 19 that the control electrode of tube 13 is made sufficiently negative to cut off current flow through resistor 14. Since tube 15 is conductive the cathode of the tube is in effect connected to the (now) negative terminal of resistor 19 and the grid of tube 13 is negative relative to its cathode. Tube 13 therefore becomes non-conductive. However this event occurs only after a control potential appears at the upper terminal of resistor 19. The upper terminal of the resistor 19 may thus be used as a source of bias potential which is zero (because there is normally no current flow through resistor 19), while no signal is impressed on the input of tube 3, but which becomes negative when a signal appears at the input of tube 3.

To summarize then, the lower terminal of resistor 14 and the upper terminal of resistor 19, respectively, provide the pair of negative bias voltages required to effect switching of the receiver and transmitter as described in the introductory paragraphs; namely, the lower terminal of resistor 14 provides a bias voltage which is normally negative relative to the negative line of the system, but which becomes zero when a control current appears at the input of tube 3, while the upper terminal of resistor 19 provides a bias voltage which is normally zero relative to the negative line, but which acquires a substantially negative value relative to that line when the control current appears in the input of tube 3. A lead 21 from the lower terminal of resistor 14 may normally impress a blocking voltage on the audio amplifier (55 in Patent 2,310,060) which disappears when incoming signals impress control voltage on the input of tube 3, and a lead 22 from the upper terminal of resistor 19 may be used to impress a zero bias voltage on modulating amplifier (101, 153 in Patent 2,310,060) allowing it normally to be conductive, and to impress a blocking bias voltage on it when a line signal appears at the input of tube 3.

The capacitor 18 and resistor 16 are so proportioned that current flow through tube 3 and resistor 16 starts very quickly after control voltage is impressed on control-electrode 7, and the cathode of diode 15 becomes negative relative to its anode, thereby producing the negative bias voltage across resistor 19 at the same instant that the control-electrode of tube 13 becomes negative to its cathode. Therefore, interruption of current flow in tube 13 follows after, and results from, the production of bias voltage at resistor 19. The disappearance of bias at terminal 21 occurs still later because capacitor 20 has to discharge through resistor 14 before such disappearance takes place. Thus the audio amplifier (55) is unblocked only after, and as a result of, the impression of blocking bias on the modulating amplifier (101, 153). Similarly upon cessation of the control voltage at control-electrode 7 current flow through tube 3 ceases at once, and the low time constant of capacitor 18 with resistor 16 permits the potential at the control electrode of tube 13 and at the cathode of diode 15 to become positive relatively quickly. Current flow thus starts quickly in tube 13 to impose negative bias voltage on terminal 21 but, the non-conductive condition of diode 15 isolates the resistor 19 and the control-electrode of the modulator amplifier (101, 153 in Patent 2,310,060) from the rest of the system. A capacitor 23 shunting said modulator control-electrode is so proportioned to resistor 19 as to have a long time constant. Thus the blocking voltage is removed from the modulator on the local transmitter only after the blocking voltage on the local audio amplifier (55 in Patent 2,310,060) has been re-applied.

The foregoing describes the transfer unit suitable for employment in the receiver of each station. However, the switching unit for the transmitter portion of each station is made somewhat more elaborate by interposing between the control current, which of course is the output current of the local microphone, and the input of tube 3a timing circuit of the type described in the application of R. C. Fox, entitled "Timing Mixer," filed concurrently herewith on October 24, 1946, bearing Serial No. 705,363, and now Patent Number 2,479,335 assigned to the assignee of the present application. The timing unit above mentioned comprises the portions of Fig. 1 to the left of the discharge tube 3. In short, instead of impressing on the input of the discharge tube 3 a quantity directly proportional to the control voltage, the control voltage itself is impressed at the input terminals of the transformer appearing at the upper left-hand corner of the drawing, and discharge tubes 31 and 32, together with the associated circuit network, modify the control voltage in such a way as to improve the performance of the telephone system in responding to speech input to the local microphone.

Referring in detail to the drawing, the output of the microphone at the local station, suitably amplified if desired, may be impressed on the primary winding 33 having a pair of secondary windings 34 and 35, respectively shunted by capacitors 36 and 37. Capacitors 36 and 37 together with windings 34 and 35 constitute resonant circuits at a frequency of approximately 1500 cycles per second. The resonant circuits peak the response of the audio amplifier system and aid in providing a satisfactory band pass characteristic. Terminals of the windings 34 and 35, which have opposite polarities at any instant are respectively connected to the anodes of the tube 31, while the other terminals of the windings 34 and 35 are connected together to the negative line terminal of the system. The cathode 38 of the tube 31 is connected through a capacitor 39 to the aforesaid negative line terminal, and the cathode 41 of the tube 31 is connected through a capacitor 42 to the same negative line. The cathode 41 is connected to the said negative line through a resistor 43 and is likewise connected to the cathode of a rectifier which may be a diode 32. The cathode of the diode 32 is likewise connected to said negative line through a resistor 44 in series with a capacitor 45 which is shunted by a resistor 46. The anode of the diode 32 is connected to the cathode 38. The cathode 38 is likewise connected to one pair of terminals of each of a pair of two-way switches 47, 48. The hinged terminal of the switch 47 is connected to the negative line through a capacitor 49 and is connected to the hinged terminal of the switch 48 through a second capacitor 51. A second contact terminal of the switch 48 is connected to the negative line, while the second terminal of the switch 47 remains unconnected.

The resistor 46 constitutes the output terminal of the timing device above described and impresses a voltage between the negative line and the control electrode 7 of the tube 3.

Where, as in the present case, it is desired that the transmitter output be switched onto the transmission line very quickly after beginning of speech in the local microphone of a station, but that the transmitter be switched off only after a substantial time delay following the cessation of speech in the said microphone, the capacitor 42 is made of substantially smaller value than the capacitor 39. It will be seen that the presence of an input signal on the primary winding 33 will energize the tube 31 so that rectified current from one anode thereof will charge capacitor 42 and rectified current from the other anode will charge capacitor 39. Because the capacitor 42 is of lower capacity than the capacitor 39, it will charge more rapidly than the latter, thereby making the cathode of the tube 32 quickly become more positive than its anode. No current can, therefore, flow through the tube 32, and the capacitor 42 will charge up quickly to the voltage of the winding 35 to be followed only slowly by the capacitor 39. With the switches 47 and 48 in the position shown in the drawings, the capacitors 49 and 51 are connected in series with each other to form a shunt circuit adding to the capacitance of the capacitor 39. While the capacitor 42, being in shunt with the resistor 43, discharges slightly during negative half periods of the winding 35, the value of the resistor 43 is made such that such discharge is only moderate.

The voltage across resistor 43 is impressed through resistors 44 and 46 and capacitor 45 on the input of tube 3. Hence the time needed to make the control electrode 7 positive and initiate conductivity in tube 3 after inception of speech currents in primary winding 33 is determined by the speed with which capacitor 42 charges up. This speed may, by making capacitor 42 sufficiently small, be made very high. Capacitor 42 will remain charged to nearly the voltage impressed by winding 35 until cessation of speech currents in the winding 33. In the meantime, capacitor 39, together with capacitors 49 and 51, have been charging more slowly through tube 31, but their value may readily be made such that they will acquire substantially the same voltage as capacitor 42 before even a short sentence has been spoken into the microphone. Cessation of microphone current will stop the charging of the capacitors 42, 39, 49 and 51 through tube 31, and capacitor 42 will begin to discharge through resistor 43. The instant that the voltage of capacitor 42 falls slightly, the cathode of tube 32 becomes negative relative to its anode; tube 32 becomes conductive and, in effect, connects the capacitor network comprising capacitors 39, 49 and 51 in multiple with capacitor 42. Because of the far greater capacitance of this capacitor network, it will discharge only slowly through resistor 43; hence the voltage impressed on the input of tube 3 after cessation of speech into the local microphone may be given as great a time delay as desired by making the size of capacitors 39, 49 and 51 great enough. In this way, switching voltage may be applied as rapidly as desired to the local transmitter upon inception of speech to the local microphone; but any desired time delay may be permitted between words or even sentences before the local microphone will lose exclusive control of the transmission line.

It will be evident that by moving the switch 47 to its other contact position, the capacitor 51 may be short-circuited and the capacitor 49 be connected directly in multiple to add a still greater amount to the capacitance of capacitor 39. On the other hand, by leaving switch 47 in its upper position and moving the switch 48 to its lower position, the capacitors 49 and 51 are, in effect, removed from the circuit, while with the switch 47 moved to its lower position capacitor 45 is connected in parallel with capacitor 39. Since the value of capacitance in these networks determines the ratio of the time delay, to the initiating time for the control voltage impressed on tube 3, the capacitor network 49, 51 and switches 47 and 48 provide means of substantially altering at will the value of this ratio.

There will, of course, be provided for each station, two different control networks, such as we have above described; namely, the control network comprising the portion to the right of the input circuit of tube 3 will be provided for the receiver section of the station, and the complete network shown in Fig. 1 will be provided for the transmitter portion of the station. There will, therefore, be included two sets of secondary windings, such as 2 and 11; but these may obviously be fed by a single oscillator 1.

In the transmitter section of the station, the resistor corresponding to resistor 14 in the drawing has its voltage drop used to normally impress a blocking voltage on the local transmitter oscillator, which blocking voltage disappears upon speaking into the local microphone. Correspondingly, the resistor corresponding to resistor 19 in the drawing is connected in the grid circuit of the radio frequency amplifier (tube 13 in Patent No. 2,310,060) to impose no negative bias thereon normally, but to block said amplifier by imposing a negative bias thereon when speech energizes the local microphone.

By properly relating the time constants of resistors 14, 16 and 19 and their associated capacitances in the manner already described for the case where tubes 3 and 13 control the switching of the receiver, the resistor 14 connected to control the local oscillator may be made to normally block said local oscillator (tube 101 in Patent 2,310,060) until after resistor 19 has blocked the receiver amplifier (tube 13 in Patent 2,310,060) and to reblock said local oscillator before resistor 19 unblocks the receiver amplifier.

We claim as our invention:

1. In combination with an electrical discharge tube having a pair of principal electrodes and a control electrode, a first source of voltage connected to send current through said tube, a bias resistor in series with a direct-current source, means to bias said control electrode in response to the combined voltage drop across said direct-current source and bias resistor, a second source and means for controlling flow therefrom of current through said bias resistor, and a rectifier and a serially connected limiting resistor in shunt with said direct-current source and said bias resistor, said rectifier being poled to prevent current flow from said direct-current source through said limiting resistor.

2. In combination with an electrical discharge tube of the gas-filled type having a pair of principal electrodes and a control electrode, a first source of voltage connected to send current through said tube, a bias resistor in series with a direct-current source, means to bias said control electrode in response to the combined voltage drop across said direct-current source and bias resistor, a second source and means for controlling flow therefrom of current through said bias resistor, and a rectifier and a limiting resistor serially connected in shunt with said direct-current source and said bias resistor, said rectifier being poled to prevent current flow from said direct-current source through said limiting resistor.

3. In combination with a first electrical discharge tube having a pair of principal electrodes and a control electrode, a first current source and a first resistor in series with said discharge tube, a direct-current source and a bias resistor connected in series with each other to impress a positive bias on said control electrode, connections for producing a negative bias on said control electrode by voltage drop in said bias resistor, a second voltage source and a second electrical discharge tube, said second source, bias resistor and said second electrical discharge tube being connected in series, means for impressing a control voltage on said second tube, a rectifier and a limiting resistor connected in series with each other to form a shunt path between the remote terminals of said bias resistor and said direct-current source, said rectifier being poled to prevent current flow from said direct-current source through said limiting resistor, and a capacitor in shunt relation with said first resistor proportioned to substantially discharge therethrough in a time which is long compared to the time required for said impression of control voltage to substantially alter the bias on said control electrode.

4. In combination with a first electrical discharge tube having an anode, a cathode and a control electrode, a first current source and a first resistor in series with said discharge tube, a direct-current source and a bias resistor connected in series with each other between said cathode and control electrode, connections for producing a negative bias on said control electrode by voltage drop in said bias resistor and comprising a second voltage source and a second electrical discharge tube connected to send current through said bias resistor, means for impressing a control voltage on said second tube, a rectifier having its cathode connected to said control electrode and its anode connected through a limiting resistor to said cathode, said rectifier being poled to prevent current flow from said direct-current source through said limiting resistor, and a capacitor shunting said limiting resistor and proportioned thereto so as to have a long time constant.

5. In combination with a first electrical discharge tube having an anode, a cathode and a control electrode, a first resistor having one terminal connected to said cathode and its other terminal connected to said anode through an alternating-current source, a direct-current source having its negative terminal connected to said cathode and having its positive terminal connected to said control electrode through a bias resistor, a second electrical discharge tube having an anode, cathode and control electrode, means for causing said direct-current source to impress a negative biasing potential between the control electrode and cathode of said second tube, a second alternating-current source connected between the anode of said second tube and the control electrode of said first tube, a limiting resistor and a rectifier connected between the cathode and control electrode of the first tube, said rectifier being so poled as to prevent current flow from said direct-current source through said limiting resistor, and means for impressing a control voltage between the control electrode of said second tube and the cathode of said first tube.

6. In combination with a first electrical discharge tube having an anode, a cathode and a control electrode, a first resistor having one terminal connected to said cathode and its other terminal connected to said anode through an alternating - current source, a direct - current source, having its negative terminal connected to said cathode and having its positive terminal connected to said control electrode through a bias resistor, a second electrical discharge tube having an anode, cathode and control electrode, means for causing said direct-current source to impress a negative biasing potential between the control electrode and cathode of said second tube, a second alternating-current source connected between the anode of said second tube and the control electrode of said first tube, a limiting resistor and a rectifier connected between the cathode and control electrode of the first tube, said rectifier being so poled as to prevent current flow from said direct-current source through said limiting resistor, and means for impressing a control voltage between the control electrode of said second tube and the cathode of said first tube, at least one of said tubes being of the gaseous discharge type.

7. In combination with an electrical discharge tube having a pair of principal electrodes and a control electrode, a first source of alternating voltage connected to send current through said tube, a bias resistor in series with a direct current source, means to bias said control electrode in response to the combined voltage drop across said direct current source and bias resistor, a second source of alternating voltage and means including another discharge tube for controlling the flow therefrom of current through said bias resistor, and a rectifier tube and a serially connected limiting resistor in shunt with said direct current source and said bias resistor, said rectifier tube being poled to prevent current flow from said direct current source through said limiting resistor.

8. In combination with an electrical discharge tube of the gas-filled type having a pair of principal electrodes and a control electrode, a first source of alternating voltage connected to send current through said tube, a bias resistor in series with a direct current source, means to bias said control electrode in response to the combined voltage drop across said direct current source and bias resistor, a second source of alternating voltage and means for controlling flow therefrom of current through said bias resistor, and a rectifier tube and a limiting resistor serially connected in shunt with said direct current source and said bias resistor, said rectifier tube being poled to prevent current flow from said direct current source through said limiting resistor.

ROY C. FOX.
FREDERIC S. BEALE.

REFERENCES CITED

The following references are of record in the file of this patent:

UNITED STATES PATENTS

| Number | Name | Date |
|---|---|---|
| 1,955,874 | Demarest | Apr. 24, 1934 |
| 2,036,307 | Steenbeck et al. | Apr. 7, 1936 |
| 2,217,401 | Geiger | Oct. 8, 1940 |
| 2,299,229 | Hall | Oct. 20, 1942 |
| 2,370,287 | Bivens | Feb. 27, 1945 |
| 2,429,762 | Koch | Oct. 28, 1947 |